(12) United States Patent
Kale et al.

(10) Patent No.: US 11,921,556 B2
(45) Date of Patent: Mar. 5, 2024

(54) DEVICE MAINTENANCE OF A DATA STORAGE DEVICE INCLUDING WEAR LEVELLING, GARBAGE COLLECTION, OR COMBINATION THEREOF

(71) Applicant: Micron Technology, Inc., Boise, ID (US)

(72) Inventors: Poorna Kale, Folsom, CA (US); Kishore Rao, El Dorado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/832,344

(22) Filed: Jun. 3, 2022

(65) Prior Publication Data

US 2022/0300055 A1 Sep. 22, 2022

Related U.S. Application Data

(63) Continuation of application No. 16/849,911, filed on Apr. 15, 2020, now Pat. No. 11,360,533.

(51) Int. Cl.
*G06F 1/26* (2006.01)
*G06F 3/06* (2006.01)

(52) U.S. Cl.
CPC ............ *G06F 1/266* (2013.01); *G06F 3/0614* (2013.01); *G06F 3/0659* (2013.01); *G06F 3/0673* (2013.01)

(58) Field of Classification Search
CPC ................................ G06F 1/266; G06F 3/0614
See application file for complete search history.

(56) References Cited

U.S. PATENT DOCUMENTS

| 9,535,614 B2 | 1/2017 | Reddy et al. |
| 10,289,317 B2 * | 5/2019 | Tai .................... G06F 3/0659 |
| 11,360,533 B2 | 6/2022 | Kale et al. |

(Continued)

FOREIGN PATENT DOCUMENTS

| CN | 108595112 | 9/2018 |
| CN | 109857337 | 6/2019 |

OTHER PUBLICATIONS

Title: Device Maintenance of a Data Storage Device Including Wear Levelling, Garbage Collection, or Combination Thereof, U.S. Appl. No. 16/849,911, filed Apr. 15, 2020, Inventors: Poorna Kale et al., Status: Notice of Allowance Mailed—Application Received in Office of Publications, Status Date: Oct. 6, 2021.

*Primary Examiner* — Tammara R Peyton
(74) *Attorney, Agent, or Firm* — Greenberg Traurig

(57) ABSTRACT

A system includes a data storage device and a host computing device. The data storage device includes a host interface; integrated circuit memory cells; and a processing device. The processing device is configured to execute firmware to perform operations requested by commands received via the host interface and maintenance operations identified by the processing device independent of commands received via the host interface. The host computing device is coupled to the host interface to provide commands with addresses to access the integrated circuit memory cells according to the address. In response to a request, the host computing device is configured to reduce, to below a threshold, a rate of transmitting to the host interface commands to access integrated circuit memory cells; and power up the data storage device to cause the data storage device to perform the maintenance operations.

20 Claims, 4 Drawing Sheets

(56) References Cited

U.S. PATENT DOCUMENTS

2011/0219203 A1    9/2011   Nurminen et al.
2017/0031816 A1    2/2017   Lee et al.
2020/0042207 A1    2/2020   Kwak et al.
2021/0325949 A1   10/2021   Kale et al.

\* cited by examiner

DEVICE MAINTENANCE OF A DATA STORAGE DEVICE INCLUDING WEAR LEVELLING, GARBAGE COLLECTION, OR COMBINATION THEREOF

RELATED APPLICATIONS

The present application is a continuation application of U.S. patent application Ser. No. 16/849,911, filed Apr. 15, 2020, the entire disclosure of which application is hereby incorporated herein by reference.

FIELD OF THE TECHNOLOGY

At least some embodiments disclosed herein relate generally to data storage devices and, more particularly, to maintaining data storage devices.

BACKGROUND

Data storage devices can operate less than optimally during field usage, such as when used in a vehicle (e.g., automobile or the like). Typically, the data storage device may not be given an opportunity to perform routine maintenance operations such as defragmentation, trimming, refreshing, wear levelling, garbage collection, combinations thereof, and the like. This can be, for example, because the data storage device does not receive enough time to complete the maintenance operations without receiving commands to access memory cells.

Improved maintenance of data storage devices is desirable.

BRIEF DESCRIPTION OF THE DRAWINGS

References are made to the accompanying drawings that form a part of this disclosure and illustrate embodiments in which the systems and methods described in this Specification can be practiced.

Like reference numbers represent like parts throughout.

DETAILED DESCRIPTION

Figure 1:
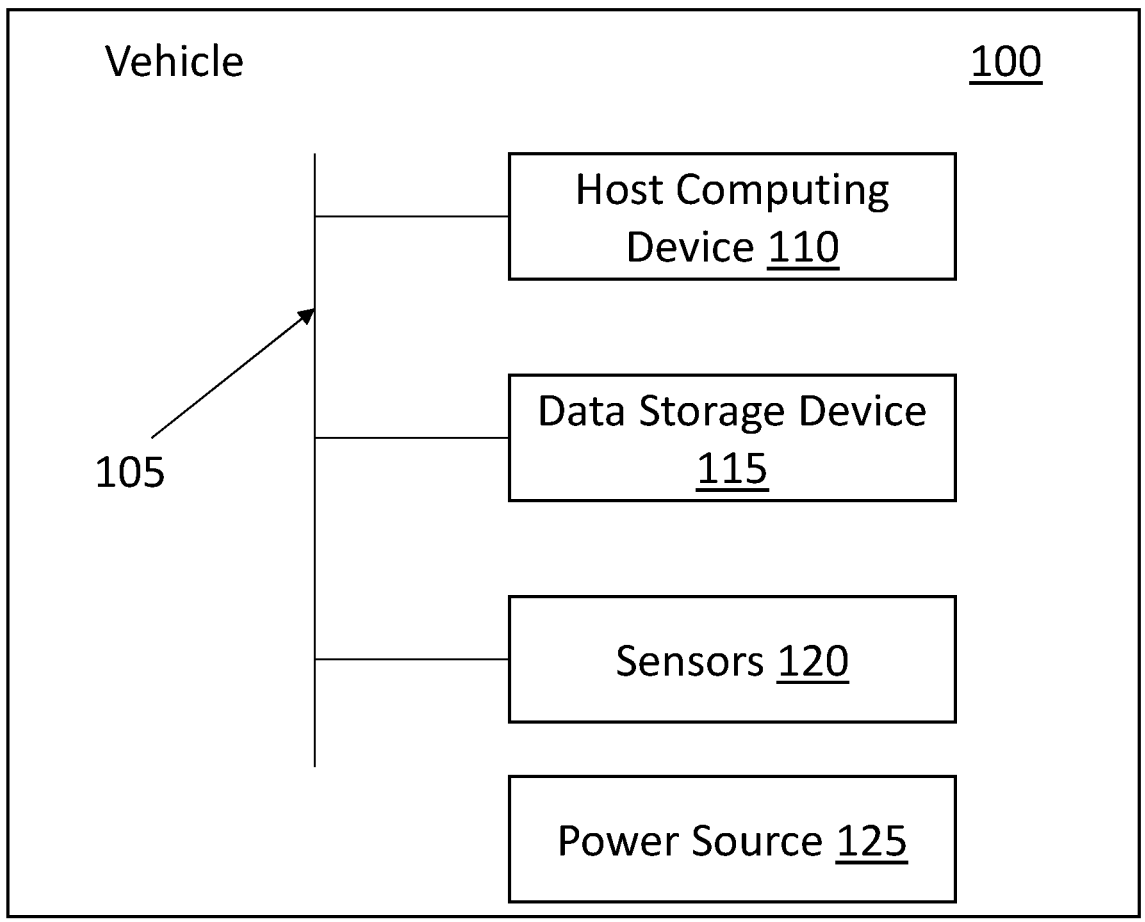
FIG. 1 is a schematic block diagram of a vehicle having computing devices connected via a communications bus, according to an embodiment

Data storage devices can be used in a variety of applications such as, but not limited to, on board vehicles (e.g., automobiles). The data storage devices can be used for various vehicle systems including, but not limited to, the engine, the infotainment system, as a data recorder, combinations thereof, or the like.

Generally, a processing device of the data storage device may not have enough processing power to perform operations such as read and write operations to specific memory cells and concurrently to perform typical maintenance operations such as, but not limited to, defragging, refreshing, wear levelling optimization, and suitable combinations thereof. The maintenance operations are generally prioritized at a relatively lower priority than the read and write operations of the data storage device. In some instances, the maintenance operations are limited to being performed when the read and write requests are received below a threshold request rate. As a result, the maintenance operations may not be performed, and the data storage device may operate in a less than optimal state over time.

The methods, devices, and systems described in this disclosure enable a renewal mode in which the maintenance operations are performed for data storage devices. The renewal mode may be initiated by, for example, a service technician (e.g., at a repair facility) at a time in which the read and write requests of the data storage device are not critical (e.g., when the vehicle is parked for maintenance). During the renewal mode, a host computing device may reduce (or stop altogether) the read and write requests. In an embodiment, the data storage device may reprioritize the maintenance operations such that the maintenance operations have a relatively higher priority than the read and write requests.

In an embodiment, when the host computing device is communicatively coupled to a network, the renewal mode can also include a firmware update for the data storage device.

The embodiments described in this Specification can, for example, result in a data storage device that has an improved lifetime before failure, especially in an automotive application.

A system includes a data storage device and a host computing device. The data storage device includes a host interface; integrated circuit memory cells; and a processing device. The processing device is configured to execute firmware to perform operations requested by commands received via the host interface and maintenance operations identified by the processing device independent of commands received via the host interface. The host computing device is coupled to the host interface to provide commands with addresses to access the integrated circuit memory cells according to the address. In response to a request, the host computing device is configured to reduce, to below a threshold, a rate of transmitting to the host interface commands to access integrated circuit memory cells; and power up the data storage device to cause the data storage device to perform the maintenance operations.

A data storage device is also disclosed. The data storage device includes a host interface communicatively coupled to a host computing device; integrated circuit memory cells; and a processing device. The processing device is configured to execute firmware to perform operations requested by commands received via the host interface and maintenance operations identified by the processing device independent of commands received via the host interface. In response to a request received in the host interface to enter a renewal mode, the processing device is configured via the firmware to reprioritize the maintenance operations to a relatively higher priority than operations requested by host commands received in the host interface from the host computing device. The processing device is also configured to perform one or more of the maintenance operations.

A method implemented in a vehicle is also disclosed. The method includes, in response to a request from a host computing device to enter a renewal mode, reducing, to below a threshold, a rate of transmitting from the host computing device to a host interface of a data storage device commands to access integrated circuit memory cells of the data storage device. The method further includes powering the data storage device to cause the data storage device to execute firmware to perform maintenance operations identified by a processing device of the data storage device that are independent of the commands received via the host interface to access the integrated circuit memory cells.

The data storage device and host computing device are described in additional detail in accordance with an implementation in a vehicle. It is to be appreciated that the systems and methods described are applicable in systems other than a vehicle in accordance with the principles described.

FIG. 1 is a schematic block diagram of a vehicle 100 having computing devices connected via a communications bus 105, according to an embodiment. The computing devices include at least a host computing device 110 and a data storage device 115, according to an embodiment. In an embodiment the vehicle 100 is an automobile and can, for example, be an autonomous vehicle, a semiautonomous vehicle, or the like.

The host computing device 110 may be representative of, for example, various computing devices in the vehicle 100. For example, the host computing device 110 can be an infotainment system; a black box data recorder; an advanced driver assistance system (ADAS); an engine controller; a camera system; a storage service; suitable combinations thereof, or the like.

The host computing device 110 is communicatively coupled to the data storage device 115 via the communications bus 105. The communications bus 105 can utilize a selected communication protocol such as, but not limited to, peripheral component interconnect (PCI); peripheral component interconnect express (PCIe); or the like.

In the illustrated embodiment, the vehicle 100 further includes sensors 120. The host computing device 110 is communicatively coupled to the sensors 120. The sensors 120 are illustrated as being communicatively coupled to the host computing device 110 via the communications bus 105. In an embodiment, one or more of the sensors 120 can be communicatively coupled to the host computing device 110 via a wireless connection, or via a combination of a wireless connection and the wired connection of the communications bus 105.

The sensors 120 may be configured to collect information related to the operation of the vehicle 100. For example, the sensors 120 may be configured to collect information related to the speed, acceleration, deceleration, etc., of the vehicle 100. In an embodiment, the vehicle 100 may additionally include one or more actuators to, for example, exert control on at least a portion of the vehicle 100 in response to one or more values received from the sensors 120. In an embodiment, the sensors 120 may be configured to stream sensed values to the data storage device 115 for storage.

The vehicle 100 can include additional features such as, a power source 125. In an embodiment, the power source 125 can be a battery that is electrically connected to the host computing device 110 and to the data storage device 115. It is to be appreciated that the vehicle 100 can include a variety of additional features.

Figure 2:
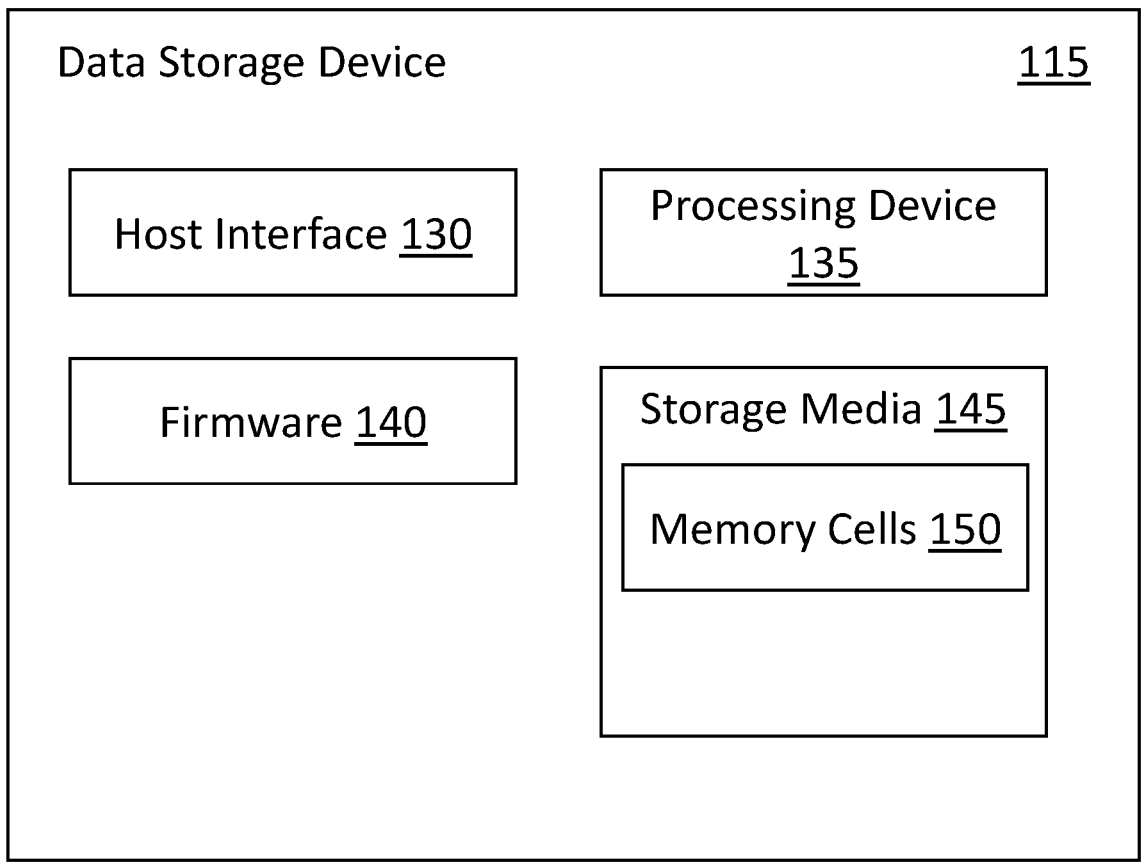
FIG. 2 is a block diagram of the data storage device of FIG. 1, according to an embodiment.

FIG. 2 is a block diagram of the data storage device 115 of FIG. 1, according to an embodiment. In an embodiment, the data storage device 115 is a solid-state drive (SSD). In another embodiment, the data storage device 115 can be a hard disk drive (HDDs); flash memory; dynamic random-access memory (DRAM); magnetic tape; network attached storage device; or the like.

The data storage device 115 includes a host interface 130, a processing device 135, firmware 140, and storage media 145.

The host interface 130 is communicatively coupled to the communications bus 105 (FIG. 1). The host interface 130 can be, for example, in a form of a standardized interface such as, but not limited to, a serial advanced technology attachment (SATA); a universal serial bus (USB); a peripheral component interconnect express (PCIe); or the like. The host interface 130 communicates information between the host computing device 110 and the storage media 145.

The host interface 130 is responsible for passing control, access, data, and other signals between the data storage device 115 and the host computing device 110 (FIG. 1).

The processing device 135 runs firmware 140 to perform operations responsive to the communications from the host computing device 110. Firmware 140 includes, for example, a type of computer program that provides control, monitoring, and data manipulation of data storage devices. The firmware 140 controls operations of the processing device 135 in operating the data storage device 115, such as storing and accessing data in the storage media 145.

The firmware 140 can be configured to include instructions for performing maintenance operations such as when the data storage device is in a renewal mode. For example, the firmware 140 includes a sequence of maintenance operations such as, but not limited to, scan, defragmentation, trim, refresh, wear levelling, garbage collection, or any combination thereof. The sequence of the maintenance operations may be defined based on the type of storage media 145. For example, the sequence can vary depending upon whether the storage media includes single-layer cells (SLCs); multi-layer cells (MLCs); triple-layer cells (TLCs); or quad-layer cells (QLCs). The sequence of maintenance operations generally is not significant and can be varied. Additionally, one or more of the maintenance operations may not be included based on its effectiveness for the type of storage media 145. In an embodiment, the host computing device 110 may be connected to a network. In such an embodiment, the maintenance operations can include updating the firmware 140.

The maintenance operations defined in the firmware 140 can have a default priority when not in the renewal mode. The default priority for the maintenance operations can be relatively lower than operations requested by commands received via the host interface 130. That is, operations requested by commands received via the host interface 130, such as read, write, or combinations thereof, are typically higher priority relative to the maintenance operations. As a result, the maintenance operations may be infrequently performed, or sometimes not at all.

The renewal mode defined in the firmware 140 causes the maintenance operations to be prioritized above the operations requested by commands received via the host interface 130. In an embodiment, the renewal mode can be entered when the request rate of the operations requested by commands received via the host interface 130 is below a threshold value, or alternatively, when operations requested by commands received via the host interface 130 are stopped for a period of time.

At least a portion of the storage media 145 is non-volatile. That is, the storage media 145 does not require power to maintain the data or information stored in the storage media 145 and the data or information is retrievable after the storage media 145 is powered off and then powered on again. Memory cells 150 of the storage media 145 can be implemented using, for example, NAND gate-based flash memory; phase-change memory (PCM); magnetic memory (MRAM); resistive random-access memory; 3D XPoint; or the like. As a result, the storage media 145 is non-volatile and can retain data stored therein without power for days, months, or years. In an embodiment, the memory cells 150 can be single-layer cells (SLCs); multi-layer cells (MLCs); triple-layer cells (TLCs); quad-layer cells (QLCs); or the like.

The data storage device 115 may utilize volatile memory for the storage of run-time data and instructions used by the processing device 135. For example, volatile dynamic random-access memory (DRAM); volatile static random-access memory (SRAM); or the like can be used. The volatile memory requires power to maintain the data or information stored therein, and the data or information is rapidly or immediately lost when the power is interrupted. In an embodiment, the processing device 135 can alternatively or additionally include in-process cache memory.

In an embodiment, the processing device 135 can store performance data for the data storage device 115 in the storage media 145. In such an embodiment, the processing device 135 can monitor how the maintenance operations impact the overall performance of the data storage device 115. The performance data can then be used to, for example, determine an order for the maintenance operations in the firmware 140. In such an embodiment, the processing device 135 may selectively determine which of the maintenance operations to perform in the renewal mode based on an expected duration of the renewal mode, selecting the maintenance operations that have a relatively higher improvement in the performance of the data storage device 115 to be performed first.

A non-transitory computer-readable storage medium can be used to store instructions of the firmware 140. When the instructions are executed by the processing device 135, the instructions cause the processing device 135 to perform a method discussed in further detail below. In one example, the storage media 145 includes the non-transitory computer-readable storage medium storing the instructions of the firmware 140.

Figure 3:
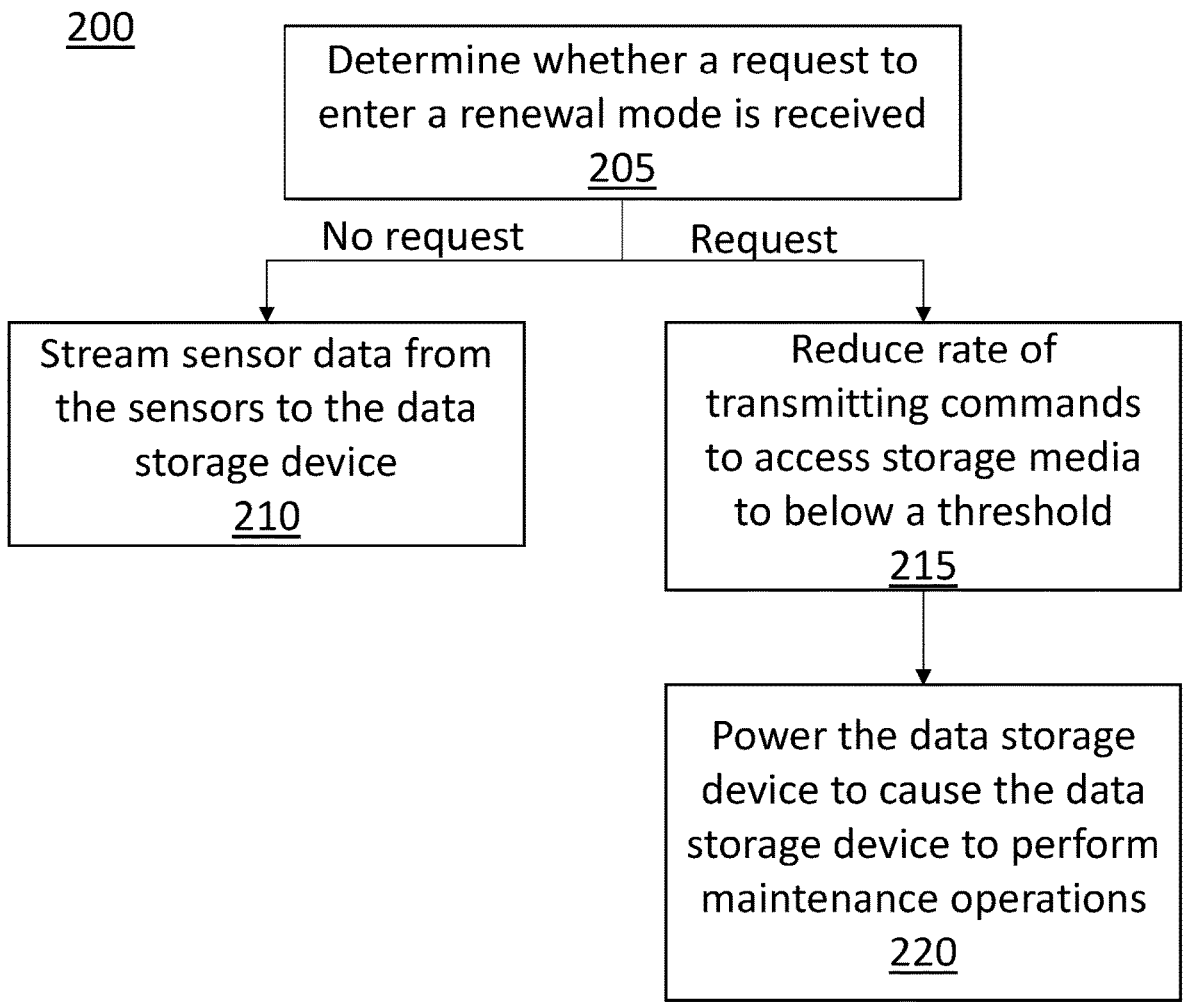
FIG. 3 shows a flowchart illustrating a method for maintaining a data storage device, according to an embodiment.

FIG. 3 shows a flowchart illustrating a method 200 for maintaining a data storage device, according to an embodiment. For example, the method 200 can be implemented in the vehicle 100 of FIG. 1 having host computing device 110 and data storage device 115 as shown in FIGS. 1 and 2.

The method 200 of FIG. 3 includes determining by the host computing device 110 whether a request to enter a renewal mode has been received at block 205. The request can be a dealer service command generated by, for example, a service technician in a variety of ways. For example, the service technician can connect a service computer to the host computing device 110 and cause a dealer service command to be generated and sent from the service computer to the host computing device 110.

If no request has been received, the method includes streaming data from sensors 120 to the data storage device 115 at block 210. Block 210 may generally be representative of an ongoing or normal operation for the sensors 120. That is, the sensors 120 can generally be configured to stream data to the data storage device 115 when not in the renewal mode. In an embodiment, the sensors 120 may be configured to stream data from the sensors 120 to the data storage device 115. In another embodiment, the sensors 120 may be configured to stream data to the host computing device 110, which then sends the data to the data storage device 115.

In response to a request being received by the host computing device 110, the method 200 includes reducing a rate of transmitting commands from the host computing device 110 to access the storage media integrated circuit memory cells 150 to the host interface 130 to below a threshold at block 215. In an embodiment, reducing the rate of transmitting commands from the host computing device 110 to access the storage media integrated circuit memory cells 150 to the host interface 130 can include stopping the commands completely (e.g., a rate of 0).

Further, in response to receiving the request, the method 200 includes powering the data storage device 115 (e.g., via the power source 125) at block 220 to cause the data storage device 115 to perform the maintenance operations. Typically, when the data storage device 115 does not receive commands from the host computing device 110 to access the storage media integrated circuit memory cells 150, the data storage device 115 is configured to enter a reduced power mode (e.g., a sleep or hibernate mode). The data storage device 115 may be configured (e.g., via firmware) to not perform maintenance operations if the data storage device 115 is in a reduced power mode. The powering of the data storage device 115 at block 220 can be performed to prevent the data storage device 115 from entering the reduced power mode, or if already in the reduced power mode, to enter a full power mode.

In an embodiment, the powering at block 220 may include the host computing device 110 sending a signal to the data storage device 115 that prevents the data storage device 115 from entering the reduced power mode. In an embodiment, the data storage device 115 is in a full power mode and block 220 prevents the data storage device 115 from switching to the reduced power mode. In an embodiment, if the data storage device 115 was previously in the reduced power mode, block 220 can include sending a signal from the host computing device to the data storage device 115 to enter the full power mode and maintain the full power mode during the renewal mode. Thus, block 220 can prevent the power from being removed from the data storage device 115 during the renewal mode. When the data storage device 115 receives the signal to enter the full power mode and is not receiving requests, the maintenance operations are triggered.

If the power is removed, or the maintenance operations are completed, the renewal mode may be exited. It is to be appreciated that in an embodiment, an explicit command to exit the renewal mode may be generated by the service technician. Upon exiting of the renewal mode, the rate of transmitting commands from the host computing device 110 to access the storage media integrated circuit memory cells 150 to the host interface 130 is no longer reduced (i.e., returned to a normal rate).

Figure 4:
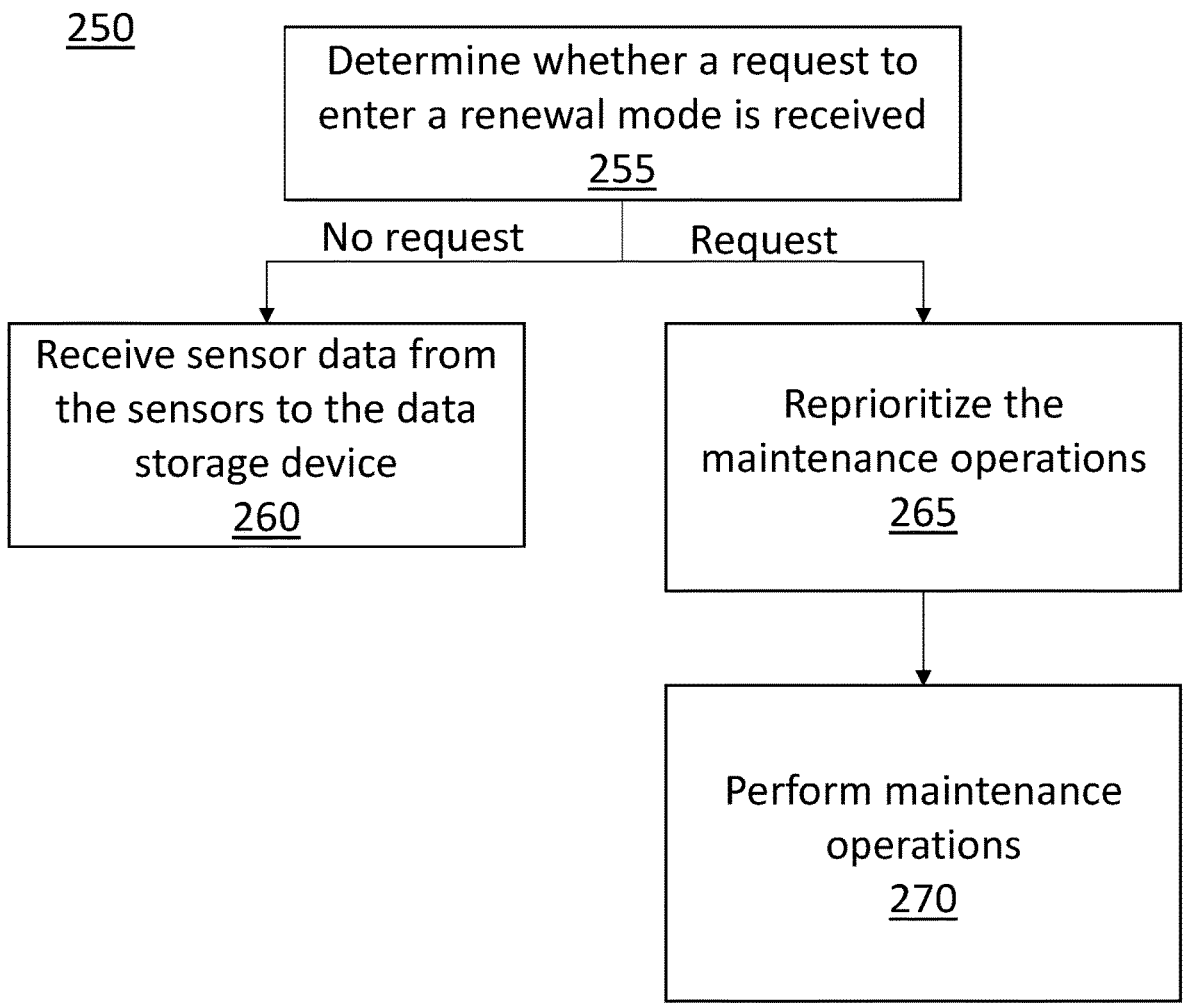
FIG. 4 shows a flowchart illustrating a method for maintaining a data storage device, according to an embodiment.

FIG. 4 shows a flowchart illustrating a method 250 for maintaining a data storage device, according to an embodiment. For example, the method 250 can be implemented in the data storage device 115 of FIG. 2.

The method 250 includes determining, by the processing device 135, whether a request to enter a renewal mode has been received via the host interface 130 at block 255. The request can be a dealer service command generated by, for example, a service technician in a variety of ways. For example, the service technician can connect a service computer to the host computing device 110 and cause a dealer service command to be generated and sent from the service computer to the host computing device 110.

If no request has been received via the host interface 130, the method 250 includes receiving data from the host computing device 110 or sensors 120 via the host interface 130 at block 260. Block 260 may generally be representative of an ongoing or normal operation for the sensors 120 or the host computing device 110. That is, the sensors 120, the host computing device 110, or combinations thereof, are generally configured to stream data to the data storage device 115 when not in the renewal mode.

In response to a request being received via the host interface 130, the method 250 includes reprioritizing, by the processing device 135, the maintenance operations to a relatively higher priority than operations requested by host commands received in the host interface 130 from the host computing device 110 at block 265. At block 265, the reprioritizing of the maintenance operations by the processing device 135 can be completed by increasing a priority of the maintenance operations to be relatively higher than the operations requested by the host commands received in the host interface 130 from the host computing device 110; preventing host commands at the host interface 130 for a period of time; decreasing a priority of the operations requested by the host commands received in the host interface 130 from the host computing device 110 to be relatively lower than the priority of the maintenance operations; or suitable combinations thereof.

One or more of the maintenance operations is performed by the processing device 135 at block 270.

Upon completion of the maintenance operations, the processing device 135 can be configured to exit the renewal mode. In an embodiment, the processing device 135 can be configured to exit the renewal mode in response to receiving a signal (e.g., from the host interface 130) indicative of a request to exit the renewal mode (e.g., as generated by a service technician). In response to receiving the signal indicative of the request to exit the renewal mode, the processing device 135 is configured to reprioritize the host commands to a relatively higher priority than the maintenance operations. That is, the processing device 135 is configured to return the maintenance operations to their default priority.

Although exemplary implementations of methods 300 and 400 are described above with reference to the components of the vehicle 100 and data storage device 115 of FIGS. 1 and 2, it should be recognized that such implementations are not limiting and that other implementations of methods 300 and 400 are within the scope of the present disclosure.

Examples of computer-readable storage media (e.g., non-transitory computer-readable storage media) include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A system, comprising:
a data storage device; and
a processor coupled to the data storage device and configured to:
perform a read command, a write command, or a combination thereof;
perform a maintenance operation identified independent of the read command, the write command, or a combination thereof;
in response to a first request, prioritize the maintenance operation at a higher priority than the read command, the write command, or a combination thereof; and
in response to a second request or upon completion of the maintenance operation, prioritize the read command, the write command, or a combination thereof, at a higher priority than the maintenance operation.

2. The system of claim 1, wherein the processor is further configured to receive a request to enter a renewal mode.

3. The system of claim 2, wherein, in response to receiving the request to enter the renewal mode, the processor is further configured to reduce, to below a threshold, a rate at which commands are transmitted for accessing the data storage device.

4. The system of claim 2, wherein, in response to receiving the request to enter the renewal mode, the data storage device is configured to receive a signal to power up the data storage device to facilitate processing of the maintenance operation.

5. The system of claim 4, wherein, in response to receiving the request to enter the renewal mode, the data storage device is configured to be prevented from entering a reduced power mode.

6. The system of claim 1, wherein the processor is further configured to exit a renewal mode upon performing the maintenance operation.

7. The system of claim 1, wherein the processor is further configured to receive a stream of data from a plurality of sensors when the first request, the second request, or a combination thereof, are not received.

8. The system of claim 1, wherein the processor is further configured to monitor how the maintenance operation impacts a performance of the data storage device.

9. The system of claim 8, wherein the processor is further configured to determine, based on the performance, an order of performing a plurality of maintenance operations including the maintenance operation in a firmware of the system.

10. The system of claim 9, wherein the processor is further configured to determine which maintenance operation of the plurality of maintenance operations to perform based on an expected duration of a renewal mode.

11. The system of claim 10, wherein the processor is further configured to select maintenance operations of the plurality of maintenance operations that have a relatively higher improvement in the performance of the data storage device to be performed before other maintenance operations of the plurality of maintenance operations.

12. The system of claim 1, wherein the processor is further configured to not perform the maintenance operation when the data storage device is in a reduced power mode.

13. The system of claim 1, wherein the processor is configured to perform the maintenance operation in order to update a firmware of the system.

14. A method, comprising:
performing, by utilizing a processor of a system including a data storage device, a read command, a write command, or a combination thereof;
performing, by utilizing the processor, a maintenance operation identified independent of the read command, the write command, or a combination thereof;
in response to a first request, prioritizing, by utilizing the processor, the maintenance operation at a higher priority than the read command, the write command, or a combination thereof; and
in response to a second request or upon completion of the maintenance operation, prioritizing, by utilizing the processor, the read command, the write command, or a combination thereof, at a higher priority than the maintenance operation.

15. The method of claim 14, further comprising receiving the read command, the write command, or a combination thereof, from a host computing device and via a host interface of the data storage device.

16. The method of claim 14, further comprising automatically entering a renewal mode when a request rate of operations requested by the read command, the write command, or a combination thereof, is below a threshold.

17. The method of claim 16, further comprising stopping receipt of additional commands after entering the renewal mode.

18. The method of claim 14, further comprising determining whether the first request is a request to enter a renewal mode.

19. The method of claim 14, further comprising powering up the data storage device when performing the maintenance operation.

20. A data storage device, comprising:
a processor coupled to the data storage device and configured to:
perform a read command, a write command, or a combination thereof;
perform a maintenance operation identified independent of the read command, the write command, or a combination thereof;
in response to a first request, prioritize the maintenance operation at a higher priority than the read command, the write command, or a combination thereof; and
in response to a second request or upon completion of the maintenance operation, prioritize the read command, the write command, or a combination thereof, at a higher priority than the maintenance operation.

* * * * *